Nov. 30, 1937.  H. L. CHISHOLM, JR  2,100,381
STABILIZER STRUCTURE FOR AUTOMOBILES
Filed March 21, 1936  2 Sheets-Sheet 2
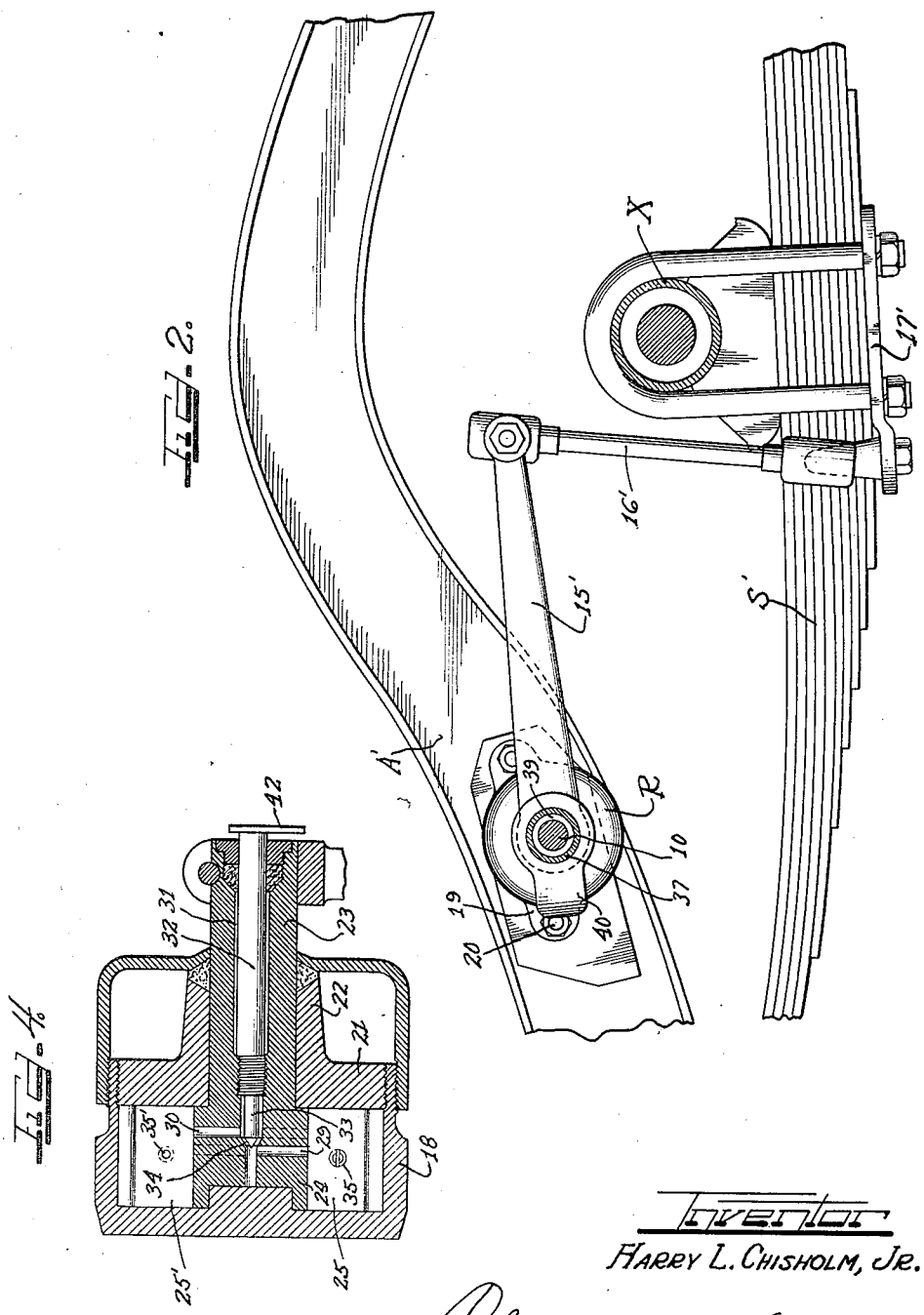

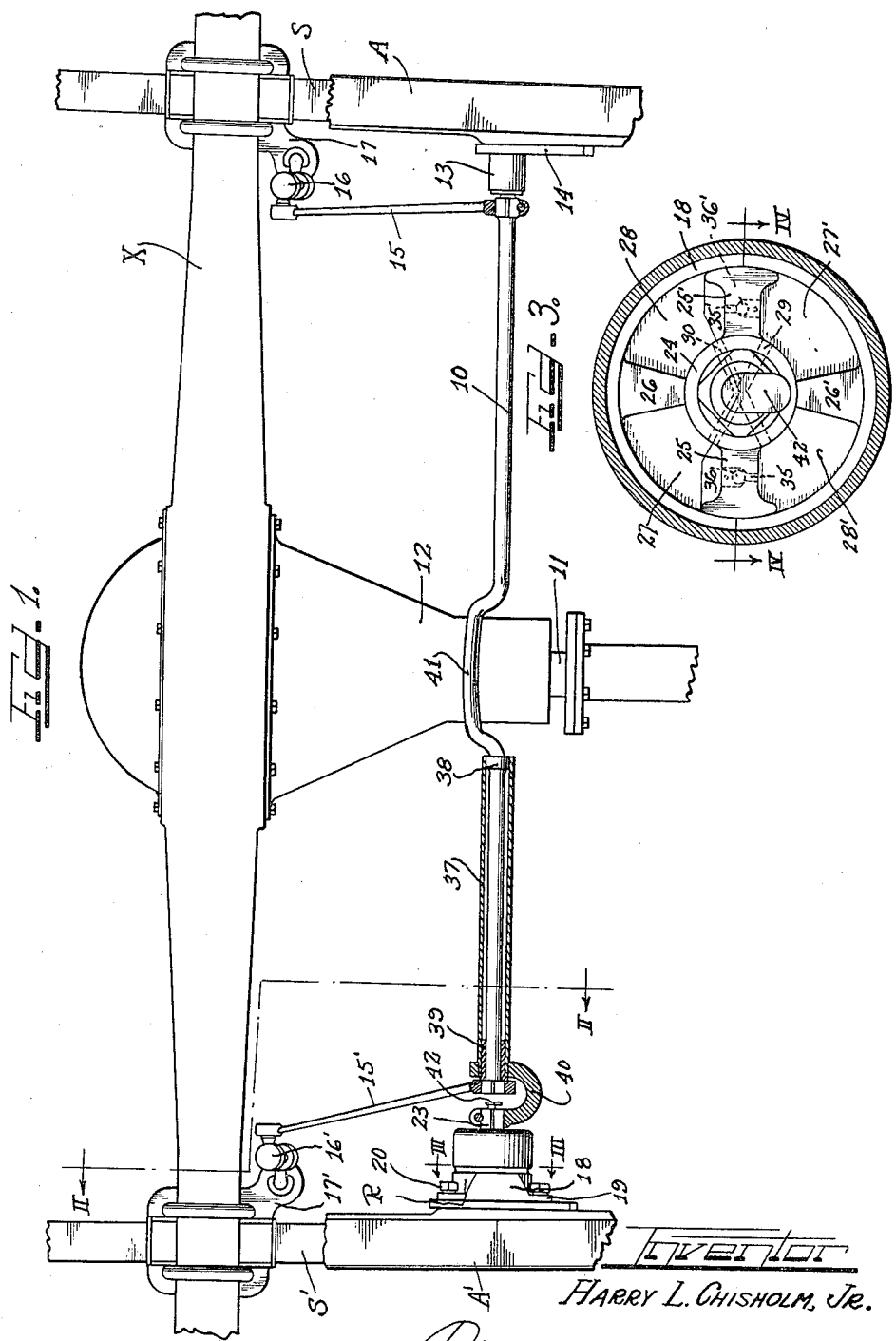

Patented Nov. 30, 1937

2,100,381

UNITED STATES PATENT OFFICE 2,100,381

STABILIZER STRUCTURE FOR AUTOMOBILES

Harry L. Chisholm, Jr., Buffalo, N. Y., assignor to Houde Engineering Corporation, Buffalo, N. Y., a corporation of New York Application March 21, 1936, Serial No. 70,046

9 Claims. (Cl. 267—11)

My invention relates to stabilizer structure adapted particularly for use on automobiles for reducing to a minimum side rocking or careening of the vehicle body when the vehicle rapidly changes its direction of travel, and to stabilize the vehicle body against side rocking or listing when the wheels on one side encounter obstacles or ruts different in magnitude from those encountered by the wheels on the opposite side.

The invention is concerned particularly with stabilizer attachments for vehicles in which a torque or torsion bar or rod extends across and is journaled at its ends on the vehicle chassis and with its ends connected by leverage with the axle structure, together with a single hydraulic shock absorber connected with the bar or rod to dampen the torsional or rotary motion thereof particularly during rebound or recoil movement of the vehicle springs.

In my copending application Serial No. 63,495, filed February 12, 1936, I disclose a stabilizing attachment for automotive vehicles wherein the hydraulic shock absorber is mounted on the vehicle frame near the middle point of the torsion rod for direct connection therewith near its middle point whereby torsional movements of the bar at opposite sides of the shock absorber are equally communicated thereto. At the front of a vehicle there is sufficient space for mounting the shock absorber near the middle point of the torque rod but at the rear of a vehicle the driving shaft or driving gearing housing for the rear axle structure would not furnish sufficient space for mounting of a shock absorber close to the middle point of the torque rod. It is therefore an important object of my present invention to provide stabilizer structure which can be efficiently applied at the front of the vehicle and which is particularly adaptable for application at the rear of the vehicle in association with the rear vehicle springs.

More in detail, the object is to provide a stabilizer structure in which a single hydraulic shock absorber which is associated with the torque rod may be mounted at the side of the vehicle on one of the chassis sills but so connected with the torque rod as to receive the torsional movement of the rod which takes place at the middle point thereof so that torsional movement instituted from either side of the vehicle will be uniformly and equally transmitted to the shock absorber for uniform and balanced operation.

My improved structure is clearly disclosed on the drawings, in which:

Figure 1 is a plan view of the rear part of a vehicle chassis with my improved stabilizer structure applied thereto;

Figure 2 is an enlarged view on plane II—II Figure 1;

Figure 3 is an enlarged section on plane III—III of the shock absorber;

Figure 4 is a section on plane IV—IV of Figure 3.

As shown on the drawings:

The rear ends of the chassis sills A and A' are supported on semi-elliptic vehicle springs S and S' which are clamped to the rear axle housing X. A distance in front of the axle housing a torque rod 10 extends horizontally between the sills on a line above the line of the drive shaft 11 and the transmission gearing housing 12 extending from the axle housing. At one end the torque rod is journaled in a bearing 13 mounted on a supporting plate 14 secured to the inner side of the sill A, and at this end of the rod a lever 15 extends rearwardly for connection by downwardly extending link 16 with the corresponding end of the axle structure. As shown, the connection is made with the clamping plate 17 by which the spring S is secured to the axle housing X.

The opposite end of the torque bar terminates short of the sill A' and a hydraulic shock absorber R of the rotary type is secured to the inner side of the sill with its axis coinciding with the axis of the torque bar. Briefly describing the shock absorber, it comprises a cylindrical housing cup 18 having ears 19 whereby it may be secured to the inner side of the sill A' as by means of screws or bolts 20. The body 18 has the cover structure 21 which, with its extension 22 forms a bearing for the shaft 23 extending from the piston hub 24 from which extends piston vanes 25 and 25', the hub and vanes, together with the partition structures 26 and 26' within the body 18 defining high pressure hydraulic working chambers 27 and 27' and low pressure hydraulic working chambers 28 and 28', the high pressure chambers being connected together by a radial passageway 29 through the hub 24, and the low pressure chambers being connected together by a passageway 30, through the hub. The piston shaft has a bore 31 through which extends the valve stem 32 which has threaded engagement wit hthe shaft bore and at its inner end terminates in a needle valve 33, or other suitable valve, the valve cooperating with a valve port 34 interposed between the passages 29 and 30 connecting respectively the high pressure working chambers and the low pressure working chambers, this valve controlling particularly the resistance to the flow of the displaced fluid from the high pressure working chambers to the low pressure working chambers. Comparatively low resistance passageways 35 and 35' are provided through the vanes 25 and 25' respectively and are controlled by check valves 36 and 36' respectively, the check valve controlling the passageways for flow of displaced fluid from the low pressure working chambers to the high pressure working chambers but closing the passageways against flow in the opposite direction so that all of the flow from the high pressure working chambers to the low pressure working chambers must be through the valve port 34 whose resistance to fluid flow is determined by the setting of the valve 33.

The adjacent end of the torque bar 10 terminates short of the end of the shock absorber shaft 23 and has secured thereto the rearwardly extending lever 15' which is connected by a downwardly extending link 16' with the clamping plate 17' for the rear spring S'.

A transmission tube or sleeve 37 surrounds the torque bar and at or near the middle point of the bar an enlargement 38 may be provided to which the transmission tube is rigidly secured at its inner end, as by welding. The outer end of the tube terminates at the end of the bar to which the lever 15' is secured and a bearing bushing 39 is provided in the tube to afford a bearing for the end of the bar. The bearing end of the transmission tube is secured to one end of a U-shaped coupling structure 40 whose other end is rigidly secured to the end of the shock absorber shaft, the supported end of the transmission tube thus forms a bearing for the torque bar end and the torsional movement of the torque bar at the center thereof is transmitted by the tube 37 by way of the U-coupling structure to the shock absorber piston shaft for control by the shock absorber of the torsion movement of the torque bar.

The operation of the stabilizer structure is apparent. For example, should the wheel at the left end of the axle structure strike an obstruction causing the end of axle to be raised, the link 16' will be correspondingly raised and the lever 15' will be swung upwardly for counterclockwise rotation (Figure 2) of the bar 10, and the resulting rotation of the bar will be transmitted to the lever 15 and link 16 for exertion of upward pull on the other end of the axle, and therefore the tendency will be to keep the vehicle body level and prevent tilting thereof. As both vehicle springs have their rebound movement, the arms 15 and 15' will be swung for clockwise rotation of the torque bar and such rotation of the bar is transmitted by the tube 37 from the middle point of the bar to the shock absorber shaft for clockwise rotation of the piston structure for displacement of the hydraulic fluid from the high pressure working chambers 27 and 27' to the low pressure working chambers 28 and 28' by way of the valve port 34 restricted by the valve 33, and the rebound movement of the springs and of the bar will be retarded and checked, and shocks to the vehicle body will be prevented. During compression movement of the vehicle springs and counterclockwise rotation of the torque bar, the low resistance passages 35 and 35' will be open to the fluid flow from the low pressure working chambers to the high pressure working chambers and the compression movement of the vehicle springs is therefore freer than the rebound movement thereof. Should the vehicle suddenly change its direction of travel, as by rapidly turning a corner the vehicle body will tend to tilt or careen. Such tilting is restricted by the torque bar connection and also by the shock absorber, and the recoil rebound movement will be retarded and absorbed.

Although, I have shown my improved stabilizer arrangement applied at the rear of the vehicle, it is evident that it could be applied and used with equal efficiency at the front of the vehicle. Should the clearance between the torque bar and the driving shaft structure 11—12 be too small, the torque bar may be provided with a lateral deflected portion 41 where it crosses the drive shaft structure so as to avoid contact of the drive shaft structure with the bar during relative movement between the chassis structure and axle structure. When the bar is deflected, the connection of the transmission tube therewith would be as close as possible to the deflected portion 41 so that the shock absorber would be responsive to the torsional or rotary movement of the torque bar practically at its middle point.

With the shock absorber mounted on the side of the vehicle, it will be readily accessible for adjustment of its valves, the valve stem at its outer end being provided with a head or lever 42 for facilitating turning of the valve stem and adjustment of the valve 33 relative to the port 34.

By providing a stabilizer structure at the front of the vehicle and also at the rear of the vehicle, only two shock absorbers will be necessary for absorbing the shocks of the wheels when traveling over uneven roadway, and at the same time swaying or tilting of the vehicle body will be reduced to a minimum and easy riding assured.

I have shown a practical and efficient embodiment of the various features of my invention but I do not desire to be limited to the exact construction, arrangement, and operation shown and described and changes and modifications may be made without departing from the scope of the invention.

I claim as follows:

1. Stabilizing structure for an automotive vehicle, comprising a torque bar extending across and supported on the vehicle chassis, levers and links connecting the ends of said bar with the respective ends of a vehicle axle, a shock absorber mounted on one side of the vehicle chassis adjacent the said torque bar, and a transmission connection between said shock absorber and said bar at substantially the middle point thereof for transmitting torsional movement at said point to said shock absorber.

2. Stabilizing structure for an automotive vehicle comprising a torque bar extending across the vehicle chassis between the sides thereof and adjacent to and parallel with one of the vehicle axle structures, levers and links connecting the ends of said bar with the respective ends of the axle structure, a hydraulic shock absorber of the rotary type mounted on one of the sides of said chassis structure and with the axis of its rotary element coinciding with the axis of said bar, and a transmission structure extending from said shock absorber rotary element and connected with said bar at substantially the center part thereof for transmitting torsional movement at said center part of the bar to said shock absorber.

3. Stabilizing structure for an automotive vehicle, comprising a torque bar extending between the sills of the vehicle chassis and parallel with and adjacent to an axle structure of the vehicle, levers and links connecting the ends of said bar with the respective ends of the axle structure, a hydraulic shock absorber of the rotary type having its body secured to one of said sills and with the axis of its rotary element coincident with the axis of said torque bar, a transmission tube surrounding said bar and secured at its inner end to said bar at substantially the middle point thereof, and means connecting the outer end of said transmission tube with the shock absorber rotary element whereby the torsional movement of said bar at the middle thereof will be transmitted to the shock absorber rotary element.

4. Stabilizing structure for an automotive vehicle, comprising a torque bar extending between the sills of the vehicle chassis and parallel with and adjacent to an axle structure of the vehicle, levers and links connecting the ends of said bars with the respective ends of the axle structure, a hydraulic shock absorber of the rotary type having its body secured to one of said sills and with the axis of its rotary element coincident with the axis of said torque bar, a transmission sleeve surrounding said bar and secured at its inner end to said bar at substantially the middle point thereof, and means connecting the outer end of said transmission sleeve with the shock absorber rotary element whereby the torsional movement of said bar at the middle thereof will be transmitted to the shock absorber rotary element, said transmission sleeve forming a bearing support for the end of said bar surrounded thereby, and bearing means for the other end of said bar supported on the adjacent sill.

5. Stabilizing structure for an automotive vehicle comprising a torque bar extending transversely of the vehicle and means connected with the ends of said bar for cooperation therewith to transmit relative movement between the vehicle chassis and axle at one side of the vehicle to corresponding relative movement of the chassis and axle at the opposite side of the vehicle, a shock absorber mounted on one side of the vehicle chassis adjacent to said torque bar, and a transmission connection between said shock absorber and said bar at substantially the middle point thereof for transmitting torsional movement at said point to said shock absorber.

6. Stabilizing structure for an automotive vehicle comprising a torque bar extending across the vehicle and means connecting with the ends of said bar for cooperating therewith to transmit relative movement between the vehicle chassis and axle at one side of the vehicle to corresponding relative movement of the chassis and axle at the opposite side of the vehicle, a hydraulic shock absorber of the rotary type having its body secured to one side of the chassis and with the axis of its rotary element coincident with the axis of the torque bar, a transmission element concentric with the adjacent end portion of said bar and having connection at its inner end with said bar at substantially the middle point thereof, and means connecting the outer end of said transmission element with the shock absorber rotary element whereby the torsional movement of said bar at the middle thereof will be transmitted to the shock absorber rotary element.

7. Stabilizing structure for an automotive vehicle comprising a torque bar extending across the vehicle and means connecting with the ends of said bar for cooperation therewith to transmit relative movement between the vehicle chassis and axle at one side of the vehicle to corresponding relative movement of the chassis and axle at the opposite side of the vehicle, a hydraulic shock absorber of the rotary type having its body secured to one side of the chassis and with the axis of its rotary element coincident with the axis of said torque bar, a transmission element concentric with the adjacent end of said bar and secured at its inner end to said bar at substantially the middle point thereof, and means connecting the outer end of said transmission element with the shock absorber rotary element whereby the torsional movement of said bar at the middle thereof will be transmitted to the shock absorber rotary element.

8. Stabilizing structure for an automotive vehicle comprising a torque bar extending across the vehicle and means connecting with the ends of said bar for cooperation therewith to transmit relative movement between the vehicle chassis and axle at one side of the vehicle to corresponding relative movement of the chassis and axle at the opposite side of the vehicle, a shock absorber comprising a body part secured to one side of the vehicle chassis and a rotary part with its axis of rotation coincident with the axis of said torque bar, a transmission element extending from adjacent said shock absorber to a point at substantially the middle of said torque bar and connected at said point with said bar, and a transmission link between the rotary element of said shock absorber and the adjacent end of said transmission element whereby the torsional movement of said bar at the middle thereof will be transmitted to the shock absorber rotary element.

9. Stabilizing structure for an automotive vehicle comprising a torque bar extending between the sills of the vehicle chassis and having one end journaled on one of said sills, a shock absorber comprising a stationary element secured to the other sill adjacent the other end of said bar and having a rotary element whose axis of rotation is coincident with the axis of said bar, means connecting the ends of said bar with the respective ends of the axle for transmitting relative movement between the chassis and axle on one side of the vehicle to corresponding relative movement of the chassis and axle at the opposite side of the vehicle, a transmission member extending from the rotary element of the shock absorber and connected at its inner end with the torque bar at substantially the middle point thereof whereby the torsional movement of said bar at the middle thereof will be transmitted to the shock absorber element, said transmission element at its outer end forming a bearing support for the adjacent end of said bar.

HARRY L. CHISHOLM, Jr.